June 13, 1944. W. HOTINE 2,351,428
AUTOMATIC CARRIER FOR STRIP MATERIALS
Filed July 14, 1939 6 Sheets-Sheet 2

INVENTOR
WILLIAM HOTINE
BY
ATTORNEY

June 13, 1944.  W. HOTINE  2,351,428
AUTOMATIC CARRIER FOR STRIP MATERIALS
Filed July 14, 1939  6 Sheets-Sheet 4

INVENTOR
WILLIAM HOTINE
BY
ATTORNEY

Patented June 13, 1944

2,351,428

UNITED STATES PATENT OFFICE 2,351,428

AUTOMATIC CARRIER FOR STRIP MATERIALS

William Hotine, Westbury, N. Y.

Application July 14, 1939, Serial No. 284,507

9 Claims. (Cl. 242—70)

This invention relates to an improved carrier unit adapted for use in multiple groups to provide continuously and without interruption a strip of flat, flexible material two or more reels in length and to means for operating such a battery of units to supply the strip material continuously to a processing device and, if desired, to rewind the used strip material on another battery of carrier units. While the invention is described herein with particular reference to a reel for use with motion picture film, and to an improved device for automatically supplying film from a battery of such reels to a motion picture projector and for winding the used film on another battery of reels, this invention is not limited in its application but may also be used generally in all cases in which it is desirable to supply a continuous strip of flexible material of a length greater than the capacity of a single reel, or to wind a similar strip upon reels or similar carrier units. For example, the invention is also applicable to the winding of long flexible metal strips and other ribbon-like material, and to the supply of such metal strips or other material to automatic processing and forming machinery, by which it may be cut, stamped or shaped into separate articles of any suitable shape, or subjected to other physical or chemical treatments. An important advantage of this invention is that it enables the handling of such long strips without damage or distortion of shape of the material.

Other and further objects of this invention will be apparent from the following description presented in relation to the drawings, and the claims appended hereto.

The drawings illustrate suitable modifications of the improved reel of this invention, and of an automatic battery of such reels.

Similar numbers refer to similar parts throughout the figures of the drawings.

Figure 9:
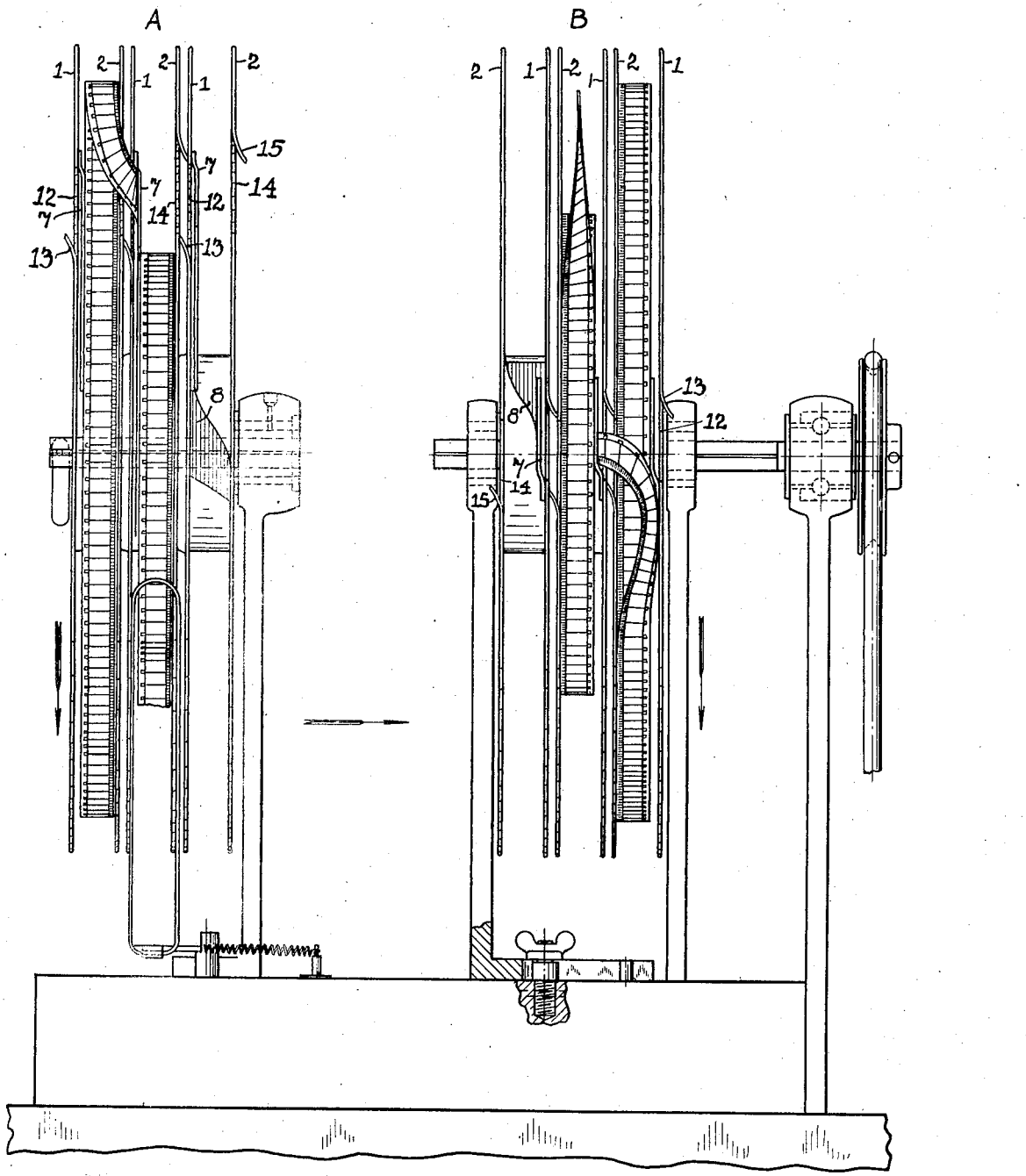
Figure 9 is an elevation, partly in section, of a automatic film reel battery for continuously supplying film from a plurality of reels to a projector and for continuously winding the used film on another plurality of reels.
Figure 10:
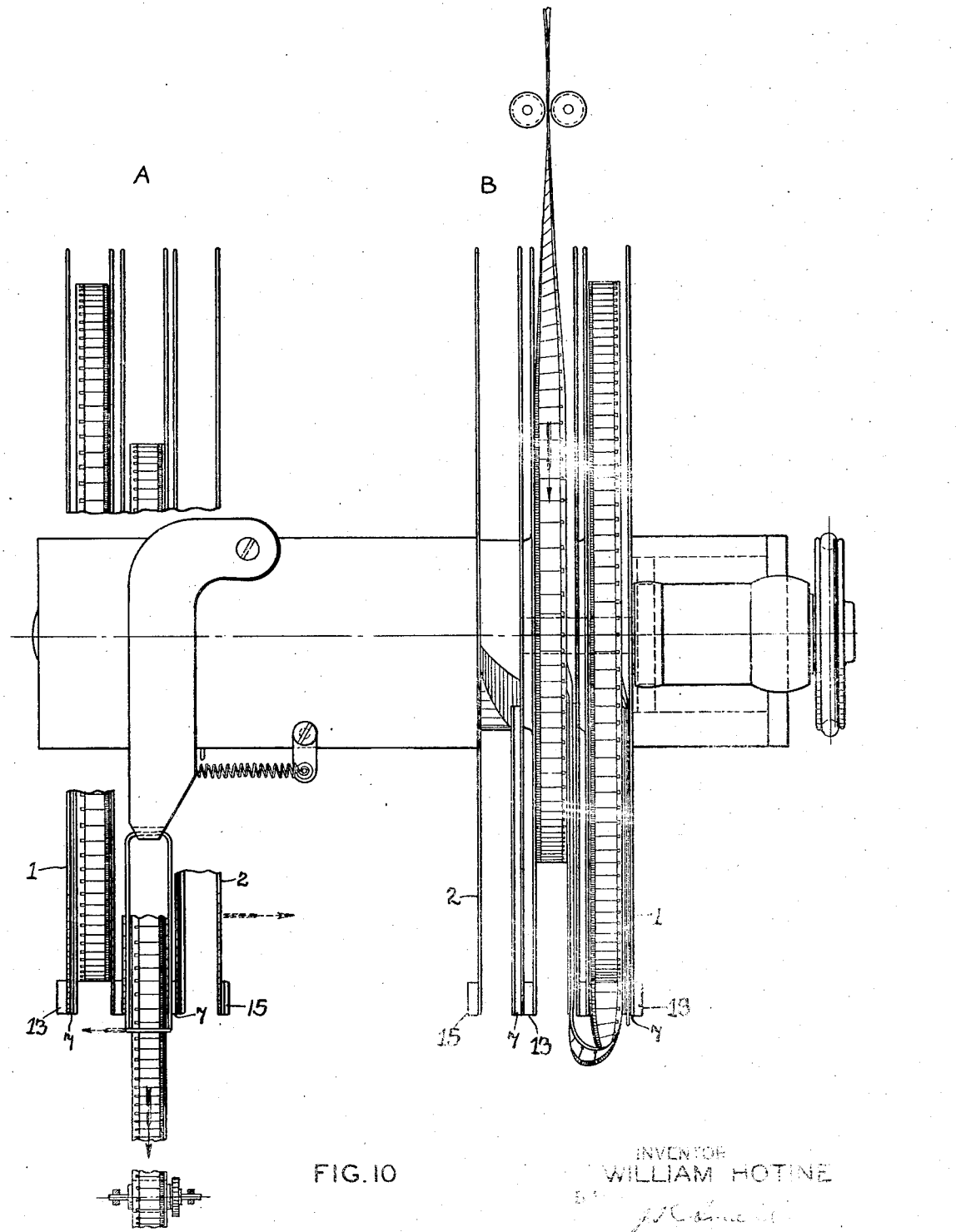
Figure 10 is a plan view, partly in section, of the automatic film reel battery of Figure 9.

Referring to the drawings in greater detail, the improved reels illustrated in Figures 1 to 7 and 9 and 10 have end or side frame members 1 and intermediate or opposite side frame members 2 which may be circular plates mounted in spaced parallel relationship upon opposite sides of a cylindrical hub member 3 by any suitable means to prevent relative rotation of side plates and hub member, as by bolts 4 passing through cylindrical openings 5 in the ribs or lateral lugs 6 disposed in spaced relation interiorly of the annular hub member 3. Attached to the inside of the side plate 1 is a U-shaped film guide member 7 providing a channel, of dimensions slightly greater than the film to be guided by the side flanges thereof. The guide member 7 is positioned so that the projection of the open edge of the U is substantially tangential to the outer surface of the hub 3, the opposite edge of the U being in the direction of the axis of the hub. The hub member 3 is cut away at one edge to provide an opening corresponding to an elongation of the U-shaped channel, and the guide member 7 may extend into this opening. A section 8 of the hub member 3 is also cut away, or recessed, in case the hub is largely solid, to provide space for the film to turn, within the hub, from a plane perpendicular to the reel axis, in the guide channel, to a plane parallel to the axis preparatory to winding on the hub 3. The walls of this opening may serve as guides to turn the film. This opening may suitably extend angularly across the hub face and through an arc of about 90° on the cylindrical surface of the hub, one edge of the cut away portion being adjacent the side plate 1, another, rearward or trailing edge extending diagonally across the hub face from the open end of the U-shaped channel, and the leading edge of the opening being more nearly parallel to the axis of the hub. The hub may be depressed or turned inwardly on this forward or leading edge to provide an arcuate shaped projection 9 depressed inwardly at an increasing angle laterally of the hub, to provide a surface conforming with the twist of the film. The guide member 7 may be a separate channel or U-shaped member mounted upon the inner side of the reel, as illustrated in Figures 1 to 5. It may be a specially shaped member, overlapping and cooperating with a slot in the side frame member, as in Figures 6 and 7, or it may be an L-shaped member, the side of the reel forming the outer wall of a U-shaped channel, as illustrated in Figures 9 and 10.

The reel is provided with an opening 10 concentric with its axis for mounting on a suitable shaft. This opening is preferably square as illustrated, to fit a square shaft, but is further provided with a slot 11 for engagement with a projection or fin on a circular shaft, in order to prevent relative rotation of reel and shaft.

The reels illustrated in Figures 2 to 5 are adapted primarily for use in a feed or supply battery. In the operation of such a battery a continuous length of film is wound on the reels by passing it first into the film guide 7 and then winding it upon the hub member 3 until the reel is filled, then passing the film from the outer winding of this reel into the film guide 7 of the adjacent reel to the right and continuing in this fashion until as many reels are filled as desired. Then, in unwinding film from the loaded reel battery, the action reverses automatically. As the film is unwound to the hub of the first reel, it disengages laterally from the open edge of the film guide 7 and starts unwinding from the outer convolute of the adjacent loaded reel to the left, continuing in this fashion until all the reels are unwound. The sideward shifts of film from an emptied reel to the adjacent full reel may be used to effect an automatic, stepwise shift of the reel battery along its axis so that the next full reel assumes the same position, relative to a projector, as was occupied by the reel just emptied.

Various modifications in the supply reel structure may be made without departing from the spirit of this invention. For example, in handling strip materials which are processed only once and have no need for rewinding, such as metal strip, one or both of the side members 1 and 2 may be separate from the hub 3 and may be used simply as stationary guides to direct the winding of the roll of strip material on the hub 3. In such a case the guide member 7 may be omitted and the strip material guided by hand or other means from the outer convolute of a completed roll into the slotted portion 8 of the hub upon which the next roll is to be wound. The guide member 7 may also be replaced simply with a radial slot in the side member 1 extending from the periphery to within the slotted portion 8 of the hub.

Figure 1:
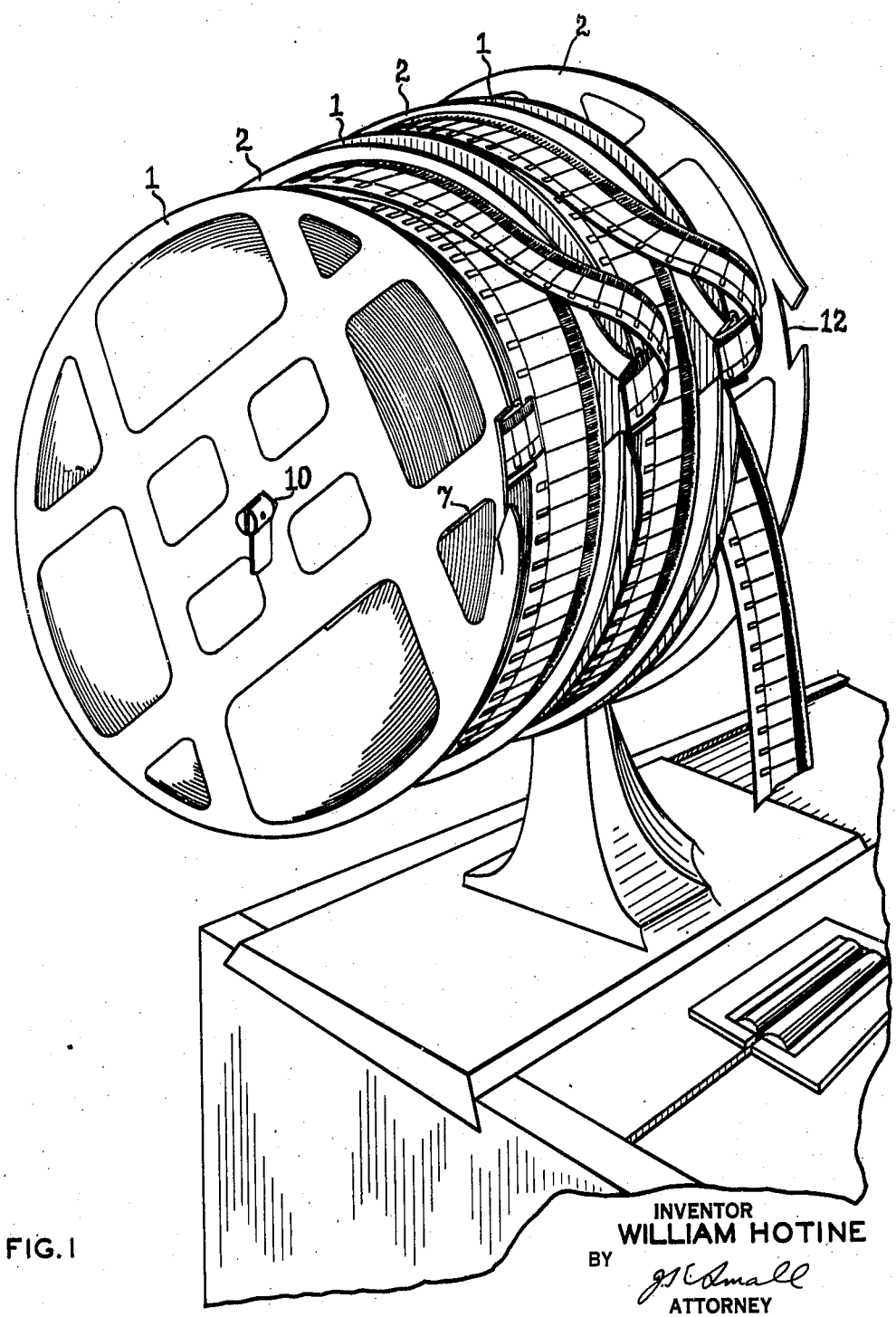
Figure 1 is a perspective view of a battery of reels loaded with film.
Figure 3:
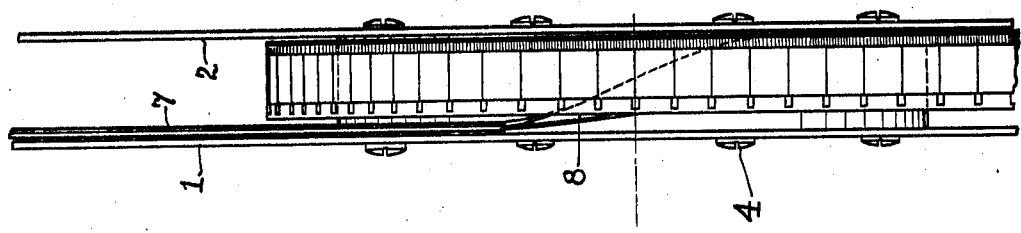
Figure 3 is a partial elevation of an edge of the reel hub, showing the reel partially loaded with film.
Figure 2:
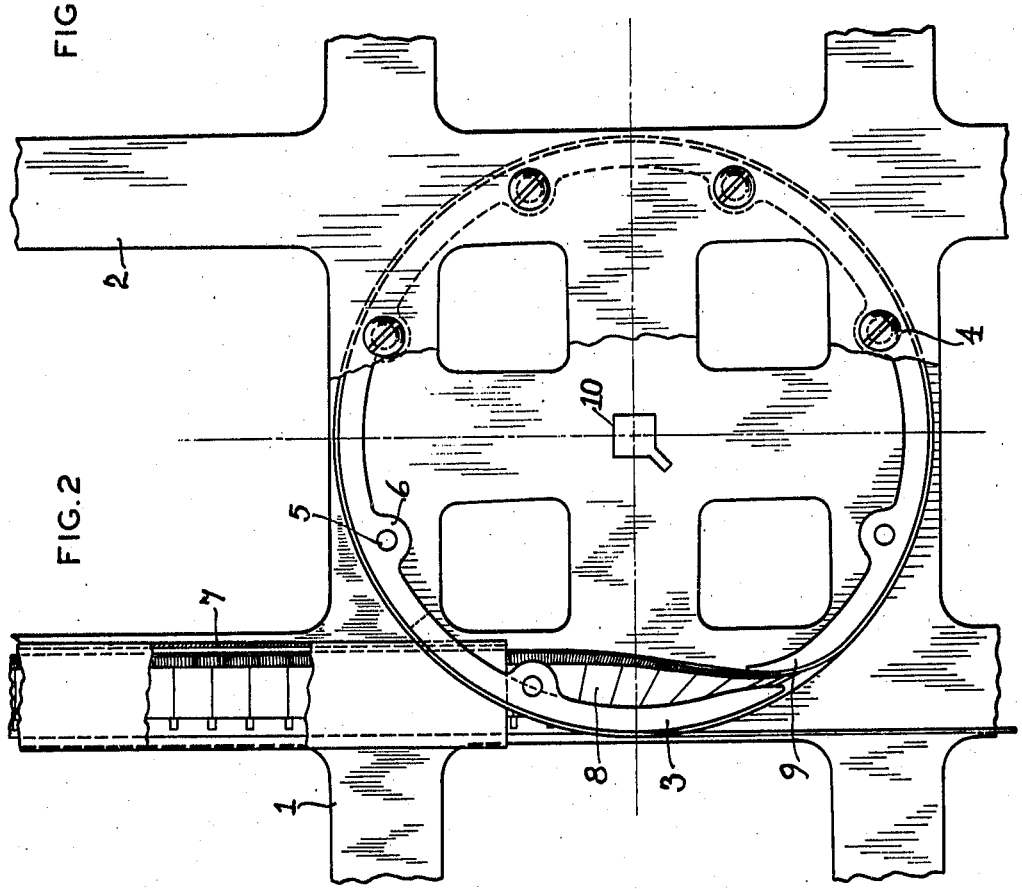
Figure 2 is a partial plan view showing the hub of a reel, a part of the side being broken away.
Figure 4:
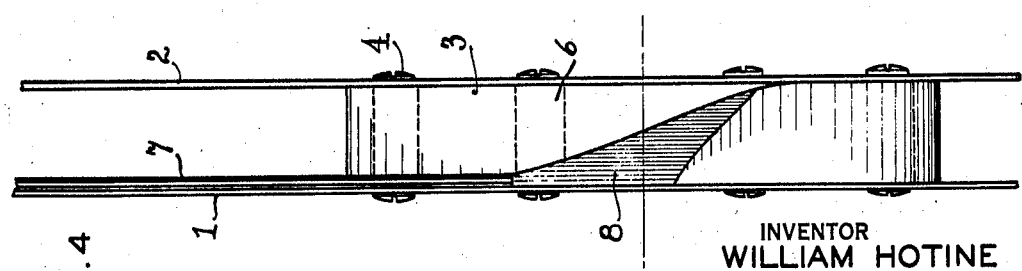
Figure 4 is the same elevation as Figure 3, but of the bare reel without any film.
Figure 5:
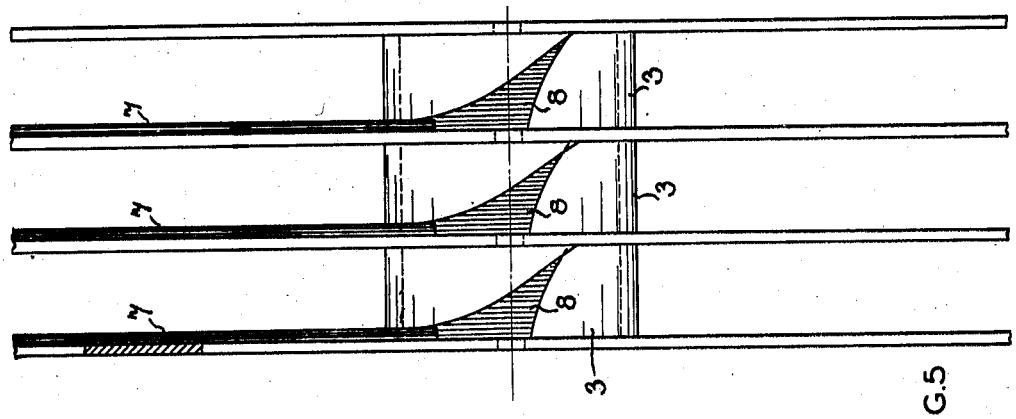
Figure 5 is an elevation of a multiple reel, partly in section.

Still other modifications of the reel structure are illustrated in Figures 1, 9 and 10. In these, the outer periphery of the side frame members 1 and 2 have cut-out openings or rim slots 12 and 14 for entrance and egress, respectively, of the film. These openings are opposed to corresponding openings in adjacent reels in assembling a battery of such separate reels. These rim slots may have outwardly protruding lips 13 and 15 formed on their radial edges.

These means also aid automatic rewinding of film upon a battery of reels. The lip member 13 serves both as a guide for the film and a spacer to hold adjacent reels apart any predetermined distance. Another opening 14 is cut in the side plate 2 opposite the opening 12, the near edge of this opening being turned outward to provide a lip member 15 that also serves as a guide for the film, deflecting it into an empty reel when the winding on the adjacent reel is completed. When two reels are placed with the openings 12 and 14 adjacent, the lip members 13 and 15 then provide side walls of a channel to guide the film between reels.

Figure 7:
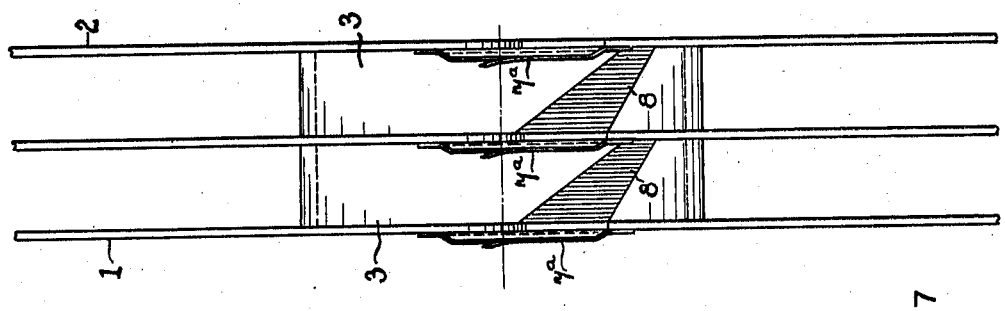
Figure 7 is an elevation of the multiple reel device illustrated in Figure 6.
Figure 6:
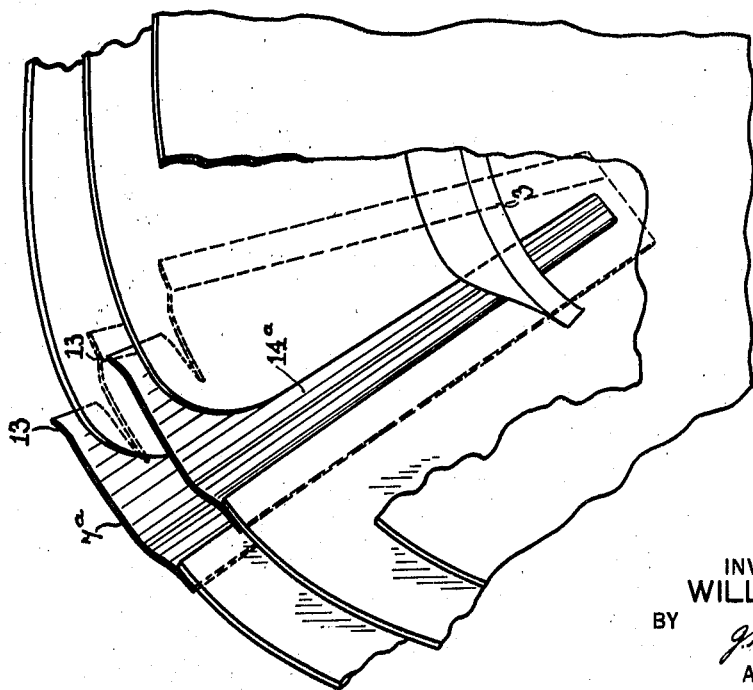
Figure 6 is a partial perspective view of another multiple reel, and illustrates a film channel and guide means adapted for automatic winding as well as unwinding.

The reel illustrated in Figures 6 and 7 is adapted especially for automatic rewinding as well as unwinding of film, and may be used in either the film supply battery or the film takeup battery of a projector. A series of hub members 3 are mounted in spaced relationship upon a common axis and are spaced by side frame members mounted coaxially therewith. A slot 14a is formed in each side frame member and extends radially from the periphery of the side frame member to a point inwardly of the hub 3. The sides of this slot are identified as leading and trailing edges, in relation to a counterclockwise direction of rotation of the reel in Figure 6, the trailing edge being arcuately formed at its outer end. A bent guide plate 7a is mounted on one side of the frame member and has one edge secured adjacent the leading edge of the slotted portion, and one edge tapering towards the hub, secured to the frame member, the bent portion of this guide plate providing a guide way for film opening through the slotted portion of the frame member into the depressed portion 8 of the hub. A tongue member 13 is rooted in the guide plate 7a at its upper end and extends arcuately outward away from the plate. This tongue member 13 serves to catch film when an adjacent full reel is shifted to the left, and cooperates with the guide way between the shaped member 7a and the trailing edge to direct the film inwardly through the radial slot in the side frame member and into the depressed portion 8 of the hub 3, thereby inducing concentric winding of the film upon the hub as the reel continues to turn.

Figure 8:
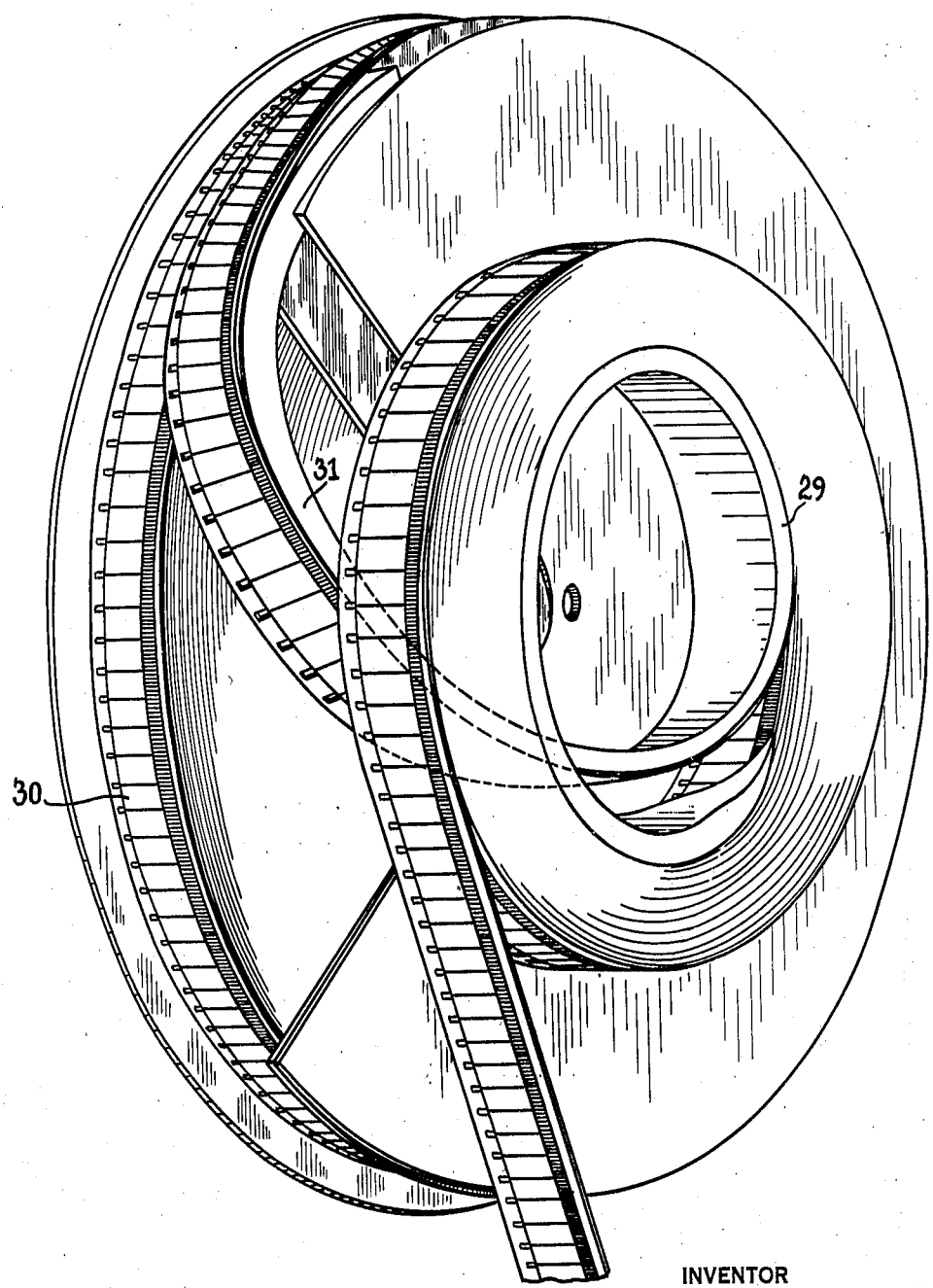
Figure 8 is a perspective view of another modification of the improved reel of this invention, and illustrates a reel having a spiral film guide leading from the hub to the periphery of an adjacent reel, the near side of the near reel being left off.

In the modification of the reel shown in Figure 8, the film is carried from the hub 29 of the near reel to the outer convolute of the film roll 30 on the adjacent reel by the spiral element 31. This requires spacing the hub members of adjacent reels farther apart than in the modification of the invention described above, but is advantageous in handling heavy or relatively inflexible strip material.

This invention is not to be limited to any specific examples or theoretical explanation of the operation of the device described herein, all such being intended only for the purpose of illustration.

I claim:

1. In a reel battery for flexible strip material, a battery carrier structure comprising a series of hub members disposed side by side in spaced relation one to the other along a common axis, side frame members secured to a hub side at each end of the series, intermediate frame members spacing each hub in the series, a strip guide mounted on one of each pair of side frame members spaced by a hub, said strip guide providing a channel extending from within the hub to the periphery of the side frame member, each hub face having an opening therein extending from the inner end of said strip guide angularly across the hub, and strip engaging means associated with each strip guide to direct the strip from each filled reel into the strip guide of the adjacent reel.

2. A reel for flexible strip material comprising a hub having an opening extending across its face, parallel side members coaxial with said hub, a strip guide on a side member providing a channel extending from the opening in said hub to the periphery of said side member and open at both inner and outer ends and along one edge.

3. A reel according to claim 2 in which the said strip guide is a channel member extending radially from the opening in said hub to the periphery of said side member.

4. A reel according to claim 2 in which said strip guide is a substantially L shaped element secured on the inner side of said side member.

5. In a reel battery for flexible strip material, a reel member comprising a hub having an opening extending across its face, a pair of parallel side members co-axial with said hub, one of said side members having a slot therein extending radially from its perimeter to a point within said hub and connecting with the hub opening, and a flange on the outer side of said side member providing a strip guide space connecting with the slot.

6. Device according to claim 5 in which the said flange is a substantially L shaped element secured to said side member along one radial edge of the said slot.

7. Device according to claim 5 in which the said flange is secured to said side member along both the radial sides of the said slot, the space within said flange in a plane perpendicular to said hub axis being wider than the width of said strip material.

8. A multiple, continuous feed carrier for flexible strip material comprising a battery of reels disposed in co-axial juxtaposition, each reel comprising a hub having an opening extending across its face between a pair of parallel side members, a strip guide on the inner face of the side member at one end of said battery of reels and on each intermediate side member, each of said guides providing a channel extending from the opening in the hub to the periphery of the side member and open at both inner and outer ends and along one edge.

9. A reel for flexible strip material comprising a hub having an opening extending across its face, parallel side members co-axial with said hub, a strip guide on a side member providing a channel extending radially from the opening in said hub to the periphery of said side member and open at both inner and outer ends and along one edge, and strip engaging means associated with the outer end of said strip guide to direct the strip into the channel.

WILLIAM HOTINE.